US008652430B2

(12) United States Patent
Yang et al.

(10) Patent No.: US 8,652,430 B2
(45) Date of Patent: *Feb. 18, 2014

(54) ORGANIC DISPERSION OF INORGANIC NANO-PLATELETS AND METHOD FOR FORMING THE SAME

(75) Inventors: Chih-Jen Yang, Taoyuan County (TW); Chyi-Ming Leu, Hsinchu County (TW); Chun-Wei Su, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,671

(22) Filed: Sep. 12, 2011

(65) Prior Publication Data

US 2012/0164050 A1 Jun. 28, 2012

(30) Foreign Application Priority Data

Dec. 22, 2010 (TW) ................ 99145159 A

(51) Int. Cl.
*C01B 17/66* (2006.01)

(52) U.S. Cl.
USPC ........... 423/265; 977/788; 977/895; 977/783; 977/779; 423/331; 524/449; 524/545; 524/445; 524/446; 524/186; 428/220

(58) Field of Classification Search
USPC .......... 423/331, 265; 977/895, 788, 783, 779; 524/449, 545, 445, 446, 186; 428/220
See application file for complete search history.

(56) References Cited

U.S. PATENT DOCUMENTS

| | | | |
|---|---|---|---|
| 5,100,581 A | 3/1992 | Watanabe et al. |
| 5,100,582 A | 3/1992 | Bhattacharyya et al. |
| 5,196,177 A | 3/1993 | Watanabe et al. |
| 5,221,497 A | 6/1993 | Watanabe et al. |
| 5,575,940 A | 11/1996 | Lofftus |
| 5,597,512 A | 1/1997 | Watanabe et al. |
| 5,796,177 A | 8/1998 | Werbelow et al. |
| 5,902,226 A | 5/1999 | Tasaki et al. |
| 6,025,455 A | 2/2000 | Yoshitake et al. |
| 6,136,907 A | 10/2000 | Sunamori et al. |
| 6,225,394 B1 | 5/2001 | Lan et al. |
| 6,380,295 B1 | 4/2002 | Ross et al. |
| 6,794,437 B2 | 9/2004 | Ross et al. |
| 7,211,613 B2 | 5/2007 | Lorah et al. |
| 7,342,065 B2 | 3/2008 | Yang et al. |
| 7,573,062 B2 | 8/2009 | Hirai |
| 2008/0242778 A1 | 10/2008 | Daren et al. |
| 2010/0081732 A1* | 4/2010 | Lin et al. ............... 523/466 |

FOREIGN PATENT DOCUMENTS

| | | |
|---|---|---|
| CN | 1534378 A | 10/2004 |
| CN | 1914264 A | 2/2007 |
| CN | 1951685 A | 4/2007 |
| CN | 101045795 A | 10/2007 |
| CN | 101053784 A | 10/2007 |
| EP | 335195 | 4/1989 |
| JP | 11-021469 | 1/1999 |
| TW | 593480 | 6/2002 |
| TW | 570942 B | 1/2004 |
| TW | I270529 | 1/2007 |
| TW | 200902613 | 11/2007 |
| TW | 200801117 A | 1/2008 |
| TW | 200934832 | 8/2009 |
| TW | 201000202 A1 | 1/2010 |
| WO | WO-2006025503 | 9/2006 |

OTHER PUBLICATIONS

Wang, et al, "Synthesis and Characterization of Dual-Functionalized Laponite Clay for Acrylic Nancomposites", Journal of Applied Polymer Science, (2007) pp. 1496-1506, vol. 106.
Petit, et al, "Size Dependence of Tracer Diffusion in a Laponite Colloidal Gel", Langmuir Article (2009), pp. 12048-12055, 25 (20).
Wheeler, et al. "Synthesis and Characterization of Covalently Functionalized Laponite Clay", Chemical Matter (2005), pp. 3012-3018, 17.
Taiwanese Notice of Allowance dated Jul. 4, 2013, as issued in corresponding Taiwan Patent Application No.: 99145156.
Chinese Office Action dated Sep. 24, 2013, as issued in corresponding China Patent Application No. 201010616533.4.
Chinese Office Action dated Oct. 14, 2013, as issued in corresponding China Patent Application No. 201010616447.3.

* cited by examiner

*Primary Examiner* — Colleen Dunn
*Assistant Examiner* — Haytham Soliman
(74) *Attorney, Agent, or Firm* — Muncy, Geissler, Olds & Lowe, PLLC

(57) ABSTRACT

The present invention provides an organic dispersion of inorganic platelets, which includes an organic solvent and H-form inorganic platelets dispersed therein. The H-form inorganic platelets have a particle size of between about 20 and 80 mm and the organic dispersion has a sold content of between about 1 and 20 wt %. A method for forming the organic dispersion is also provided.

9 Claims, 2 Drawing Sheets

ORGANIC DISPERSION OF INORGANIC NANO-PLATELETS AND METHOD FOR FORMING THE SAME

CROSS REFERENCE TO RELATED APPLICATIONS

This application claims priority of Taiwan Patent Application No. 099145159, filed on Dec. 22, 2010, the entirety of which is incorporated by reference herein. The subject matter of this application relates to that of copending application filed Sep. 12, 2011 for "ORGANIC/INORGANIC COMPOSITE FILM AND METHOD FOR FORMING THE SAME" by Su, Leu and Yang. The disclosure of the copending application is incorporated herein by reference in their entirety.

BACKGROUND OF THE INVENTION

1. Field of the Invention

The present invention relates to an inorganic material, and in particular relates to a dispersion of inorganic nano-platelets.

2. Description of the Related Art

A sol formed from an inorganic material dispersed in an organic solvent has good processability and storability. Silica and metal oxides are typical inorganic materials used for dispersal in an organic solvent. In particular, the silica has advantages such as being cheap, high hardness, a low thermal expansion coefficient or the likes. An organic/inorganic composite material which has both advantages of the inorganic material and the organic material is formed from a mixture of an organic polymer and a sol. Specifically, the organic/inorganic composite material may have a high content of inorganic materials by using a high concentration sol formed from silica type materials.

The different shapes of silica particles, such as a spherical shape, elongated shape or platelet, have different reactivities and are formed from various types of silica aqueous or alcohol dispersion with different processes. Nissan Chemical discloses an elongated shape silica dispersion, for example, referring to U.S. Pat. Nos. 5,221,497 and 5,597,212. Also, U.S. Pat. No. 5,902,226 discloses a spherical shape silica. However, the organic dispersion or sol, or even the aqueous dispersion or sol, of the silica platelets, has never been commercially available as spherical or elongated shape silica particles.

Only few references relevantly disclose the silica platelets. For example, U.S. Pat. No. 5,796,177 discloses a method for forming the silica platelets, in which the silica source is mixed with NaOH repeatedly and then thoroughly mixed with $Al_2O_3$ or $ZrO_2$ in a high temperature to form the silica platelets. However, the sol of the silica platelets is milk white and opaque. In addition, the silica platelets can only be dispersed in water, and cannot form an organic sol. Moreover, the step of adding NaOH repeatedly reduces process stability.

Silica platelets have a larger surface area than spherical and elongated shape silica particles and its size is also easier to control. Thus, the silica platelets have better applicability. A novel organic dispersion of inorganic platelets is needed to be developed.

BRIEF SUMMARY OF THE INVENTION

An embodiment of the present invention provides an organic dispersion of inorganic nano-platelets, including an organic solvent; and H-form inorganic nano-platelets dispersed in the organic solvent, wherein the H-form inorganic nano-platelets have a particle size of between about 20 and 80 nm, and wherein the organic dispersion has a solid content of between about 1 and 20 wt %

An embodiment of the present invention provides a method for forming an organic dispersion of inorganic nano-platelets, including: (a) dispersing inorganic nano-platelets into water to form an aqueous dispersion; (b) performing an ion-exchange procedure to the inorganic nano-platelets by adding an ion-exchange resin thereto, for forming an aqueous dispersion of an H-form inorganic nano-platelets; (c) adding the aqueous dispersion of an H-form inorganic nano-platelets into a mixture of a first organic solvent and a second organic solvent; and (d) removing the first solvent and water for dispersing the H-form inorganic nano-platelets into the second organic solvent.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
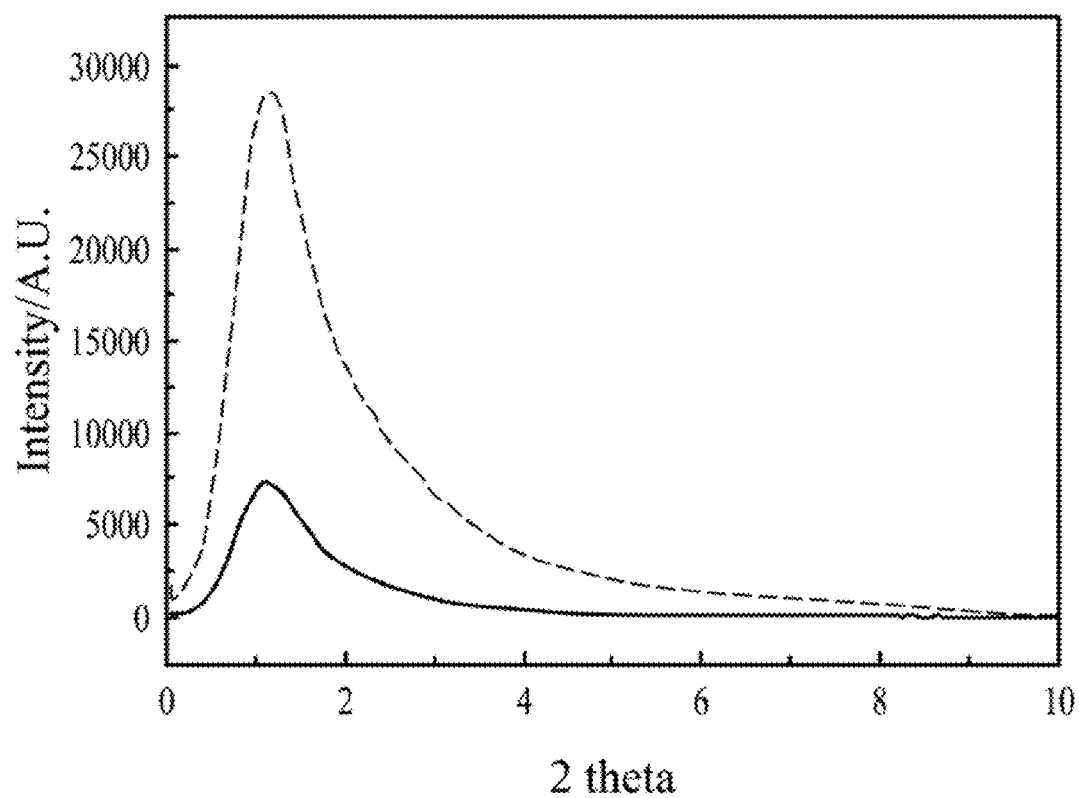
FIG. 1 shows the XRD spectrums of the non-processed inorganic platelets and the H-form inorganic platelets in Example 1.

The following description is of the best-contemplated mode of carrying out the invention. This description is made for the purpose of illustrating the general principles of the invention and should not be taken in a limiting sense. These are, of course, merely examples and are not intended to be limiting. The scope of the invention is best determined by reference to the appended claims.

In conventional method for forming an organic dispersion of inorganic materials, clay is dispersed in water, and then metal cations of the clay are exchanged with quaternary ammoniums such that the clay is transformed to organic clay for dispersing in an organic solvent. Alternatively, a water soluble polymer is added to the clay aqueous dispersion to open the layered structure of the clay, which is referred to as intercalation. In the first method, the resulting composite material does not have much inorganic content. In the second method, the resulting composite material has a low crack temperature and poor water resistance due to the hydrophilic property of the water soluble polymer.

The present invention provides an organic dispersion of inorganic nano-platelets and a method for forming the same, in which the metal ions of the inorganic nano-platelets are directly exchanged with hydrogen ions by an ion-exchange procedure and no dispersing agents or modifying agents are added. Thus, compared to the conventional method which uses the quaternary ammonium salt or the water soluble polymer to perform intercalation, only a simple process is needed. Furthermore, the inorganic nano-platelets may maintain their shape and size after transfer to the organic solvent. The resulting organic dispersion of inorganic nano-platelets may have a high solid content.

According to the embodiments of forming an organic dispersion of inorganic nano-platelets, an aqueous dispersion of inorganic nano-platelets is provided first. The inorganic nano-platelets may be natural or synthetic nano-clay. The nano-clay may have a particle size of between about 1 and 100 nm. It should be noted the transparency of the dispersion should be determined by the size of the clay. For example, the dispersion may be opaque when the clay has a particle size of larger than 100 nm. In one embodiment, the inorganic nano-platelets may have an aspect ratio of not less than 10, preferably between about 20 and 100. The inorganic nano-platelets may include smectite clay, vermiculite, halloysite, sericite, mica, synthetic mica, layered double hydroxide, synthetic smectite clay or combinations thereof. The smectite clay may include montmorillonite, saponite, beidellite, nontronite, hecorite, stevensite or combinations thereof. In one embodiment, the aqueous dispersion may have a solid content of between about 1% and 20%.

Next, an H-form cation ion-exchange resin and an OH-form anion ion-exchange resin are added to the aqueous dispersion to perform an ion-exchange procedure. In this ion-exchange procedure, the metal cations of the inorganic nano-platelets may be replaced with hydrogen ions. In one embodiment, a mole ratio of the H-form cation ion-exchange resin and the OH-form anion ion-exchange resin is about 1:1. As such, the amount of hydrogen ions released from the reaction of the anion ion-exchange resin and the amount of hydroxide ions released from the reaction of the cation ion-exchange resin can be maintained substantially equal. In one embodiment, the H-form ion-exchange resin may be DOWEX® H-form resins, and the OH-form anion ion-exchange resin may be DOWEX® OH-form resins.

After the ion-exchange procedure, all of the inorganic nano-platelets are transformed to the H-form inorganic nano-platelets. Accordingly, the layered structure of the inorganic nano-platelets may be opened resulting in the H-form inorganic nano-platelets to be uniformly dispersed in the water by means of a smaller particle size.

Next, the aqueous dispersion of the H-form inorganic nano-platelets is thoroughly mixed with a mixture of a first organic solvent and a second organic solvent for transferring the H-form inorganic nano-platelets to the phase of the first and the second organic solvent. The first organic solvent may include any organic solvents soluble with the second organic solvent and water. For example, the first organic solvent may include any alcohol soluble with water, ethyl ether, acetone or combinations thereof. In a preferred embodiment, the first organic solvent may be isopropanol. A ratio of the water and the first organic solvent is about between 1:1 and 1:3, and a ratio of the water and the second organic solvent is between about 1: 0.07 and 1:3. The second organic solvent may include N-methyl-2-pyrrolidone (NMP), N,N-dimethyl acetamide (DMAc), γ-butyrolactone (GBL), N,N-dimethylformamide (DMF), dimethyl sulfoxide (DMSO), xylene, toluene or combinations thereof. Note that the boiling points of the water and the first organic solvent may be preferably lower than that of the second organic solvent such that the water and first organic solvent can be removed simultaneously in sequential processes. The amount of the second organic solvent may contribute to the solid content of the resulted organic dispersion; however, one skilled in the art should understand that the ratio of the first organic solvent and the second solvent can be variously changed according to the types of the first organic solvent and the second organic solvent.

Next, the water and the first organic solvent are removed by a vacuum decompression concentration such that the H-form inorganic nano-platelets are all dispersed in the second organic solvent for forming the organic dispersion of the H-form inorganic nano-platelets. In the present embodiment, the organic dispersion of the H-form inorganic platelets may have a solid content of between about 1 and 20 wt %, a plate shape, a particle size of between about 20 and 80 nm and an aspect ratio of not less than 10 or preferably between about 20 and 100. The organic dispersion may have a transparency larger than 90%

To summarize, the present invention provides a dispersion of inorganic platelets, and in particular, the dispersion may be an organic dispersion. Compared to the conventional method which uses quandary ammonium salts and hydrophilic polymer, only simple processes such as ion-exchange and phase transfer procedures are needed to be performed. Furthermore, it is unnecessary to use any salts, polymers or other additives. Thus, the resulting inorganic platelets may have better applicability. For example, the advantages such as high thermal resistance and ultra low thermal expansion coefficient of the inorganic platelets are not influenced by the addition of the additives. Thus, the organic dispersion of inorganic platelets may have good storage stability. Meanwhile, when forming an organic/inorganic composite material with an organic polymer, the inorganic nano-platelets can be uniformly dispersed because their size is still maintained in nano-scale and the organic dispersion is highly soluble with the organic polymer.

COMPARATIVE EXAMPLE 1

800 g of a clay platelets aqueous dispersion having a solid content of 20.2 wt % and a pH value of 2.8 was prepared. Next, the clay platelets aqueous dispersion was mixed with various ratios of water, $AlCl_3$ aqueous solution and NaOH solution, repeatedly. Finally, a clay platelets aqueous dispersion having a pH value of 7.64 was obtained. The clay platelets had a particle size of 370 nm. The aqueous dispersion had a solid content of 15 wt %, which was milky white when observed (detailed procedures are disclosed in U.S. Pat. No. 5,196,177).

EXAMPLE 1

Figure 2:
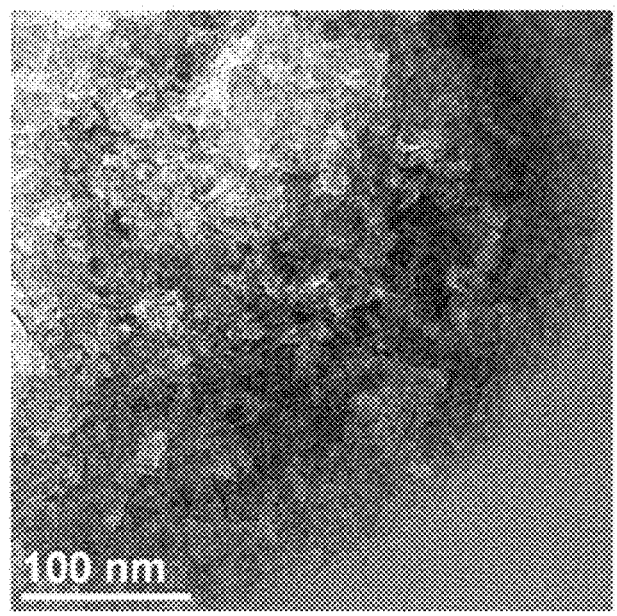
FIG. 2 shows the TEM image of the H-form inorganic platelets in Example 1.

30 g of clay platelets (Laponite RDS, particle size of 20 nm×20 nm×1 nm) was dispersed in 970 g of deionic water to form 1000 g of 3 wt % of a clay platelets aqueous dispersion. Next, 300 g of an H-form cation ion-exchange resin (Dowex H form) and 300 g of OH from anion ion-exchange resin (Dowex OH form) were added to the clay platelets aqueous dispersion to perform ion-exchange. After filtering, 960 g of 1.8 wt % of an H-form clay platelets aqueous dispersion was obtained. Then, the H-form clay platelets aqueous dispersion was thoroughly mixed with 1440 g of isopropanol and 328.3 g of DMAc. Isopropanol and DMAc were removed by vacuum decompression concentration and 338.8 g of an H-form clay organic dispersion was obtained. The H-form clay platelets organic dispersion had a solid content of 5.1 wt %, and was transparent when observed. The structure of the H-form clay platelets were characterized by XRD, as shown in FIG. 1. The particle size of the H-form clay platelets was 20 nm×20 nm×1 nm, characterized by a TEM image, as shown in FIG. 2.

EXAMPLE 2

The same procedures as in Example 1 were repeated except that 270.2 g of DMAc was added. 278.6 g of an H-form clay organic dispersion (DMAc dispersion) was obtained. The H-form clay organic dispersion had a solid content of 6.2 wt %, and was transparent when observed. The structure of the H-form clay platelets were characterized by XRD. The particle size of the H-form clay platelets was 20 nm×20 nm×1 nm, characterized by a TEM image.

EXAMPLE 3

60 g of platelets clay (Laponite RDS, particle size of 20 nm×20 nm×1 nm) was dispersed in 970 g of deionic water to form 1000 g of 3 wt % of a clay aqueous dispersion. Next, 300 g of an H-form cation ion-exchange resin (Dowex H form) and 300 g of OH from an anion ion-exchange resin (Dowex OH form) were added to the clay aqueous dispersion to perform ion-exchange. After filtering, 1920 g of 1.7 wt % of an H-form clay aqueous dispersion was obtained. Then, the H-form clay aqueous dispersion was thoroughly mixed with 3800 g of isopropanol and 293.7 g of DMAc. Isopropanol and DMAc were removed by decompression concentration and 315.6 g of an H-form clay organic dispersion was obtained. The structure of the H-form clay platelets were characterized by XRD. The particle size of the H-form clay platelets was 20 nm×20 nm×1 nm, characterized by a TEM image.

EXAMPLE 4

The same procedures as in Example 3 were repeated except that the 260.2 g of DMAc was added. 248.3 g of an H-form clay organic dispersion (DMAc dispersion) was obtained. The H-form clay organic dispersion had a solid content of 13.1 wt %, and was transparent when observed. The structure of the H-form clay platelets were characterized by XRD. The particle size of the H-form clay platelets was 20 nm×20 nm×1 nm, characterized by a TEM image.

EXAMPLE 5

The H-form clay organic dispersions in Examples 1-4 were placed in an ambient environment for longer than one month. The particle sizes of the H-form clay platelets were still maintained and the dispersions were still transparent. The results are summarized in Table 1.

TABLE 1

| Example | 1 | 2 | 3 | 4 |
|---|---|---|---|---|
| Storage time | longer than one month | longer than one month | longer than one month | longer than one month |

FIG. 1 shows the XRD (X-ray diffraction) spectrums of the non-processed inorganic platelets and the H-form inorganic platelets in Example 1. As shown in FIG. 1, it is observed that all of the diffraction peaks of the H-form inorganic platelets in Example 1 (solid line) were the same with the non-processed inorganic platelets (dotted line). It can be suggested that the H-form inorganic platelets still had the plate shaped crystalline. FIG. 2 shows the TEM (transmission electron microscopy) image of the H-form inorganic platelets in Example 1. As shown in FIG. 2, plate shaped particles with a particle size of between about 20 and 80 nm was observed, which are significantly smaller than that (370 nm) of the inorganic platelets in comparative 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming an organic dispersion of inorganic nano-platelets, comprising:
    (a) dispersing inorganic nano-platelets into water to form an aqueous dispersion;
    (b) performing an ion-exchange procedure to the inorganic nano-platelets by adding an ion-exchange resin thereto, for forming an aqueous dispersion of an H-form inorganic nano-platelets, wherein the ion-exchange resin comprises an H-form ion-exchange resin and an OH-form ion-exchange resin;
    (c) adding the aqueous dispersion of the H-form inorganic nano-platelets into a mixture of a first organic solvent and a second organic solvent; and
    (d) removing the first solvent and water for dispersing the H-form inorganic nano-platelets into the second organic solvent.

2. The method as claimed in claim 1, wherein the H-form inorganic nano-platelets have a particle size of between about 20 and 80 nm.

3. The method as claimed in claim 1, wherein the H-form inorganic nano-platelets have an aspect ratio greater than 10.

4. The method as claimed in claim 1, wherein the inorganic nano-platelets comprises smectite clay, vermiculite, halloysite, sericite, mica, synthetic mica, layered double hydroxide, smectite clay or combinations thereof.

5. The method as claimed in claim 4, wherein the smectite clay comprises montmorillonite, saponite, beidellite, nontronite, hecorite, stevensite or combinations thereof.

6. The method as claimed in claim 1, wherein the first organic solvent comprises alcohols, acetone, ethyl ether or combinations thereof.

7. The method as claimed in claim 1, wherein the second solvent comprises N-methyl-2-pyrrolidone (NMP), N,N-dimethyl acetamide (DMAc), y-butyrolactone (GBL), N,N-dimethylfonnamide (DMF), dimethyl sulfoxide (DMSO), xylene, toluene or combinations thereof.

8. The method as claimed in claim 1, wherein the organic dispersion has a solid content of between about 1 and 20 weight percent.

9. The method as claimed in claim 1, wherein a mole ratio of the H-form ion-exchange resin and the OH-form ion-exchange resin is about 1:1.

* * * * *